United States Patent [19]

Southwell

[11] Patent Number: 4,470,311

[45] Date of Patent: Sep. 11, 1984

[54] APPARATUS FOR MEASURING FLUID FLOW IN PIPE SYSTEMS

[76] Inventor: Leslie H. Southwell, 555 St. Andrews, West Vancouver, British Columbia, Canada

[21] Appl. No.: 88,002

[22] Filed: Oct. 25, 1979

[51] Int. Cl.³ .......................... G01F 1/20; G01F 1/68
[52] U.S. Cl. ............................................ 73/861.69
[58] Field of Search ..................... 73/202, 204, 861.69

[56] References Cited

U.S. PATENT DOCUMENTS

| | | | |
|---|---|---|---|
| 970,965 | 9/1910 | Speed | 73/861.69 |
| 1,181,490 | 5/1916 | Levin | 73/861.69 |
| 3,559,482 | 2/1971 | Baker et al. | 73/202 X |
| 3,603,148 | 9/1971 | Rikuta | 73/202 |
| 4,215,565 | 8/1980 | Zanker | 73/202 |

FOREIGN PATENT DOCUMENTS 886109  11/1971  Canada ........................... 73/861.69

*Primary Examiner*—Herbert Goldstein

[57] ABSTRACT

An elbow for a pipe system and through which fluid of the system flows. One or more thermistors located so as to sense the temperature differential between points on opposite curved sides of the elbow resulting from different fluid velocities in the fluid flowing past these points. The one or more heated thermistors are connected in a wheatstone bridge so that the bridge measures the temperature differential between the two points.

4 Claims, 5 Drawing Figures

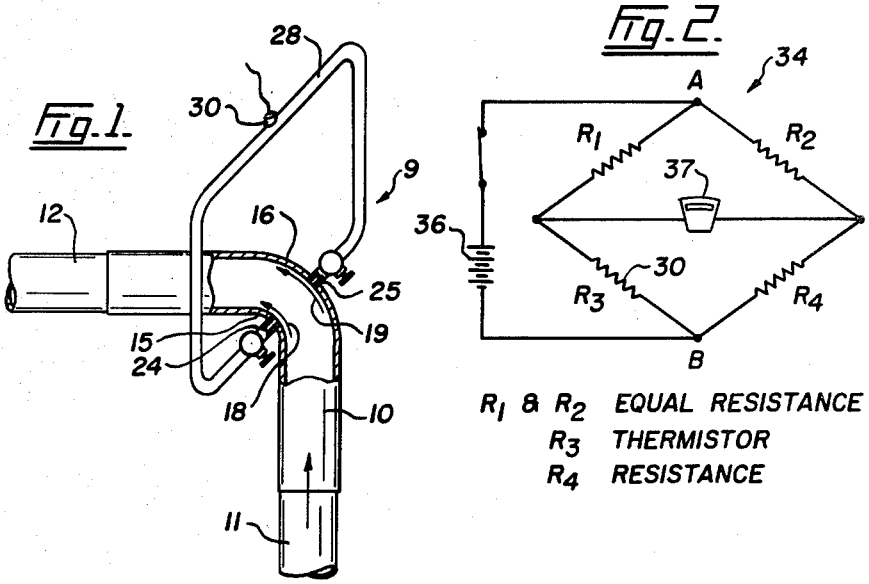
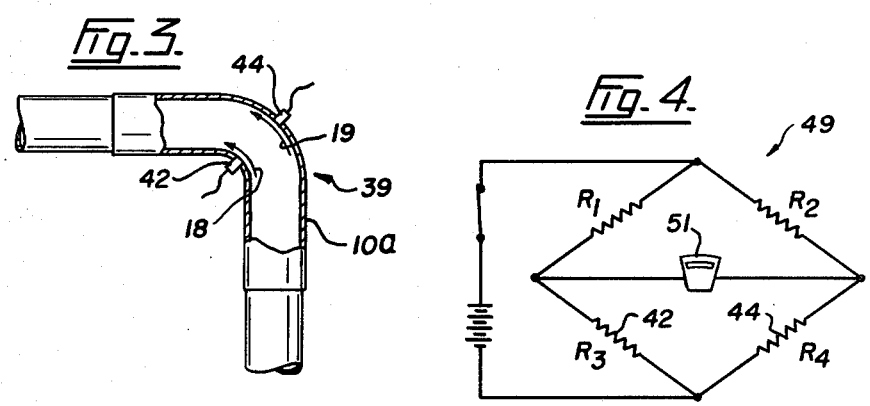
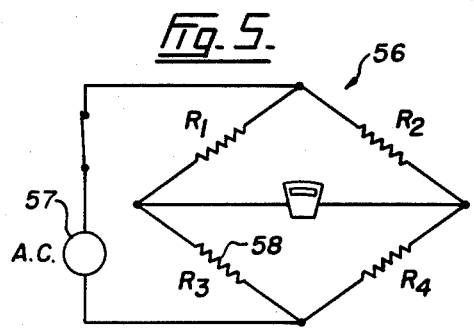

APPARATUS FOR MEASURING FLUID FLOW IN PIPE SYSTEMS

This invention relates to apparatus for measuring the flow of fluid, liquid or gas, in pipe systems.

The present apparatus utilizes an elbow in a pipe system for measuring the flow of liquid therethrough. Such a measuring elbow is well known in the prior art. It is known that there is a pressure and velocity differential between the liquid flowing along the outer curve of the elbow and that flowing along the inner curve thereof. This pressure and velocity differential can be used to determine the mean flow of fluid through the elbow. However, in the prior art, two pressure taps are located substantially diametrically opposite each other on the plane of symmetry of the elbow. One tap is connected to one side of a metering device and the other tap is connected to the other side of said metering device. The metering devices used are differential pressure meter sets, manometer tubes and electronic flow transducers. In each case, fluid from the pipe system travels to the metering device. These metering devices are not sensitive to small changes in the pressure differential, and it has not been practical to use them for systems through which corrosive liquids and gases flow, or with systems through which slurries and the like flow.

The apparatus of the present invention is an improvement over the apparatus of the prior art because it is sensitive to very small changes in the pressure and velocity differential at the elbow, and it can be used when corrosive liquids or slurries flow through the pipe system. The latter advantage is attained because of the fact that the fluid does not flow to or through the metering device.

As is known, when any fluid flows around a bend such as an elbow bend, centrifugal forces produce a differential and velocity proportional to the mean flow. There is a velocity differential between the liquid flowing around the outside of the bend and that flowing around the inside thereof. As a result of this, there is a rate of transfer differential between the liquid flowing along the outside of the bend and that flowing along the inside thereof.

The present apparatus includes sensing means connected to the bend or elbow for measuring parameters at the inner curve to detect the rate of transfer differential in the parameters. Meter means connected to the sensing means fluid measures the differential, and the square root of this temperature differential indicates the mean flow through the bend or elbow.

An important feature of this invention is use of heated thermistors or heated thermally dependent capacitors as the temperature sensing means. These are extremely sensitive temperature measuring devices. Another feature of this invention is that these sensing means can be operatively connected in a leg of a wheatstone bridge which, as a result, indicates even the slightest changes in the parameter differential at the elbow. Thus, this apparatus is not affected by corrosive fluids or slurries flowing through the pipe system.

Apparatus in accordance with this invention comprises an elbow to be connected in a pipe system and through which fluid flows when the apparatus is in operation, heated temperature sensing means connected to the elbow at two points having different fluid velocity and pressures resulting in different rates of heat exchange between the fluid and the sensors rates of transfer as fluid flows through the elbow, and meter means connectable to said sensing means to measure the temperature differential between said points, Preferred forms of this invention are illustrated in the accompanying drawings, in which:

FIG. 1 is a side elevation, partly in section, of one form of the invention, with one form of sensing means, FIG. 2 illustrates meter means in the form of a wheatstone bridge used with the form of the invention illustrated in FIG. 1, FIG. 3 is a view similar to FIG. 1 of an alternative form of the invention with an alternative sensing means, FIG. 4 illustrates meter means in the form of a wheatstone bride used with the alternative of FIG. 3, and FIG. 5 illustrates a wheatstone bridge meter arrangement similar to that of FIG. 2, but utilizing another alternative sensing means of the invention.

Referring to FIGS. 1 and 2 of the invention, 9 is one form of apparatus in accordance with this invention which includes an elbow 10 incorporated in a pipe system having an inlet pipe 11 connected to one end of the elbow and an outlet pipe 12 connected to the opposite end thereof. The elbow 10 has substantially concentric inner and outer surfaces 15 and 16. As the fluid flows around the bend of the elbow, centrifugal forces create a different pressure and velocity along the inner curved surface, indicated at 18, from that flowing along the outer curved surface, as indicated at 19. The pressure and velocity of the fluid along the inner surface at 18 is less than that of the fluid flowing along the outer surface at 19. This results from the fact that the fluid has to travel faster around the outer surface than around the inner surface. This also results in an increase in the temperature exchange rate between the fluid and a heated body for the fluid flowing around the outer surface relative to that flowing along the inner surface. The present invention takes advantage of this temperature exchange rate differential to determine the mean flow of fluid through the elbow.

A tap 24 is connected to the elbow at a point on the inner surface 15, and a tap 25 is connected at a point on the outer surface 16. These taps are substantially diametrically opposite each other, and are located approximately on the plane of symmetry of the elbow. The taps can be located at different points along the curved surfaces of the elbow, but are preferably substantially midway between the ends thereof.

A by-pass pipe 28 extends between and is connected to taps 24 and 25. As these taps open into the elbow, the pipe 28 in effect extends from the inner curved surface of the elbow to the outer curved surface thereof and communicates with the interior of the elbow at these surfaces. This pipe forms a closed loop through which some of the fluid of the pipe system flows as a result of the pressure differential between the fluid flowing along the inner curved surface and that flowing along the outer curved surface. This pressure differential and consequently the flow through by-pass 28 is proportional to the rate of flow of the fluid through the elbow. The diameter of pipe 28 is relatively small in order to keep the flow through the by-pass down to a minimum so as not to create turbulence or swirling of the liquid in the elbow.

A heated thermistor 30 is connected to pipe 28 at any point along the length thereof, but preferably midway between the tap points 24 and 25. The heated resistor of thermistor 30 is subjected to the heat and velocity of the fluid flowing through by-pass 28. The faster the flow the higher the temperature rate of exchange and vice-versa. As the rate of flow through by-pass 28 is determined by the pressure differential at the elbow surfaces, the rate of temperature exchange to which the thermistor is subjected is relative to this differential. As the resistance of the thermistor increases and decreases when the temperature rate of exchange decreases and increases, respectively, the resistance of the thermistor is proportional to the rate of flow through the by-pass.

FIG. 2 illustrates a wheatstone bride 34 having resistors R1 and R2 of equal resistance in one leg, and resistors R3 and R4 in the other leg. This is a standard wheatstone bridge excepting that R3 is thermistor 30. A direct current source 36 is connected to the point A and B of the two legs of the bridge in the usual manner.

Any fluctuations in the resistance of resistor R3 changes the balance of the bridge and are indicated by meter 37. As stated above, the resistance of thermistor 30 changes with changes of flow in by-pass pipe 28 and, therefore, the meter 37 indicates these changes and consequently changes in the pressure and velocity differential between the opposite sides of elbow 10. The square root of this pressure and velocity differential indicates the mean flow of fluid through the elbow.

FIGS. 3 and 4 illustrate an alternative form of apparatus 39 in accordance with this invention. Apparatus 39 includes an elbow 10a which is the same as elbow 10 but instead of the taps and the by-pass pipe, a pair of matched thermistors 42 and 44 are provided at tap points on the inner curved surface 18 and on the outer curved surface 19, respectively, of the elbow. The heated thermistors 42 and 44 sense the temperature of the fluid moving along the inner surface 18 and the outer surface 19, respectively, of the elbow. Actually the faster moving fluid flowing past thermistor 44 tends to increase the temperature thereof relative to the temperature of thermistor 42 which is exposed to the slower moving fluid flowing, thereby upsetting the balance between the thermistors. In other words, the rate of heat exchange at thermistor 44 is greater than that at thermistor 42.

FIG. 4 illustrates a wheatstone bridge 49 having resistors R1 and R2 in one leg and resistors R3 and R4 in the other leg thereof. This is a standard wheatstone bridge excepting that the resistors R3 and R4 are thermistors 42 and 44, respectively, Resisitors R1 and R2 have the same resistance, and thermistors 42 and 44 are matched. Any change in the resistance of thermistors 42 and 44 resulting from changes in the temperature differential at elbow 10a changes the balance of bridge 49, these changes being indicated by meter 51 thereof. Thus, when there is a change in the pressure and temperature differential at the elbow, the change is indicated by the bridge meter. The square root of the temperature differential is the mean flow of the fluid moving through the elbow.

As is well known, the thermistors 30, 42 and 44 are very sensitive temperature measuring devices. Thus, any slight variations in the temperature differential at the elbow, are indicated. In apparatus 9 of FIG. 1, some of the fluid flowing through the elbow 10 flows through by-pass 28, but it does not enter the meter 37 of the apparatus. As a result, this apparatus can be used with any clear liquid flowing through the pipe system, even though it is corrosive or otherwise dangerous. The advantage of apparatus 39 of FIGS. 3 and 4 is that none of the fluid leaves elbow 10a so that this alternative can be used for any type of fluid passing through the elbow, whether or not it is corrosive, otherwise dangerous or in the form of a slurry.

Thermally dependent capacitors whose capacitance depends on its temperature can be used in the place of thermistors 30, 42 and 44, and they will function in the same manner. However, the wheatstone bridge 56 associated therewith would have to have a source 57 of alternating current, as shown in FIG. 5. Resistor R3 of this bridge is a thermally dependent capacitor 58 and functions in the same manner at thermistor 30 of apparatus 9. If two thermally dependent capacitors are used as in apparatus 39, they would be located in the wheatstone bridge in the same positions as thermistors 42 and 44 (R3 and R4) of FIG. 4, the only difference being that the current source would be an alternating current source, as in FIG. 5, instead of a direct current source.

I claim:

1. Apparatus for measuring the flow of fluid in a pipe system, comprising:
    an elbow to be connected in a pipe system and through which fluid flows when the apparatus is in operation;
    heat transfer rate sensing means coupled to said elbow for measuring the heat transfer rate for the fluid flowing adjacent that portion of the elbow having the shortest radius and for the fluid flowing adjacent that portion of the elbow having the longest radius; and
    meter means connectable to said sensing means to measure the difference in heat transfer rate, the square root of the latter difference indicating the mean fluid flow rate through said elbow.

2. Apparatus for measuring the flow of fluid in a pipe system comprising
    an elbow to be connected in a pipe system and through which fluid flows when the apparatus is in operation, said elbow having inner and outer substantially concentric curved surfaces,
    an inner tap point on the inner curve surface,
    an outer tap point on the outer curve surface,
    inner and out heated temperature sensing means mounted in said inner and outer tap points, respectively, each heated temperature sensing means being exposed to fluid flowing in said elbow, the temperature difference of the heated sensing means being proportional to the square of the difference of the rate at which fluid flows past each of the heated temperature sensing means, and
    meter means connectable to said sensing means to measure the temperature difference between said points.

3. Measuring apparatus as claimed in claim 2 in which said heated temperature sensing means comprises
    a first temperature sensor at one of said points of the elbow, and
    a second temperature sensor at the other of said points of the elbow,
    said meter means being connectable in said first sensor and to said second sensor to measure the temperature differential sensed thereby.

4. Measuring apparatus as claimed in claim 2 in which said temperature sensing means comprises
    a first thermistor at one of said points of the elbow, and
    a second thermistor at the other of said points of the elbow; and
    said meter means comprises a wheatstone bridge, said thermistors being operatively connected in a leg of said bridge.

* * * * *